United States Patent
Sampath et al.

(10) Patent No.: US 12,423,710 B2
(45) Date of Patent: Sep. 23, 2025

(54) SYSTEM AND METHOD FOR GENERATION OF SELF-GUIDED RECOVERY PROCEDURES AND SUGGESTIONS

(71) Applicant: Dell Products L.P., Round Rock, TX (US)

(72) Inventors: Kapil Sampath, Cary, NC (US); Veenu Gupta, Milpitas, CA (US); Rahul Deo Vishwakarma, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 93 days.

(21) Appl. No.: 17/667,176

(22) Filed: Feb. 8, 2022

(65) Prior Publication Data
US 2023/0252485 A1 Aug. 10, 2023

(51) Int. Cl.
 *G06Q 30/016* (2023.01)
 *G06F 40/205* (2020.01)
 *G06F 40/279* (2020.01)

(52) U.S. Cl.
 CPC ......... *G06Q 30/016* (2013.01); *G06F 40/205* (2020.01); *G06F 40/279* (2020.01)

(58) Field of Classification Search
 CPC ... G06Q 30/016; G06F 3/0484; G06F 40/205; G06F 40/279
 See application file for complete search history.

(56) References Cited

U.S. PATENT DOCUMENTS

| | | | | |
|---|---|---|---|---|
| 6,029,258 | A * | 2/2000 | Ahmad | G06F 11/366 714/48 |
| 10,410,219 | B1 * | 9/2019 | El-Nakib | G06F 16/90332 |
| 2005/0223285 | A1 * | 10/2005 | Faihe | G06F 11/2257 714/25 |
| 2007/0192085 | A1 * | 8/2007 | Roulland | G06F 16/3329 704/9 |
| 2008/0294423 | A1 * | 11/2008 | Castellani | G06F 16/3329 704/4 |
| 2009/0106224 | A1 * | 4/2009 | Roulland | G06F 16/3325 707/999.005 |
| 2009/0138766 | A1 * | 5/2009 | Rui | G06F 11/0778 714/57 |

(Continued)

OTHER PUBLICATIONS

Hilbert, D. M., & Redmiles, D. F. (2000). Extracting usability information from user interface events. ACM Computing Surveys (CSUR), 32(4), 384-421. (Year: 2000).*

(Continued)

*Primary Examiner* — John S. Wasaff
(74) *Attorney, Agent, or Firm* — Chamberlain, Hrdlicka, White, Williams & Aughtry; Aly Z. Dossa

(57) ABSTRACT

A self-guided troubleshooting guide generation method includes: receiving a first assistance request from the user; in response to receiving the first assistance request, scanning a first user interface (UI) through which the first assistance request is transmitted and extracting text from the first UI; parsing the extracted text and identifying an error message in the extracted text; comparing, after the identifying, the error message to data stored in an assistance request database; and generating, based on the comparing, solution information for resolving the error message and displaying the solution information on a display displaying the first UI.

9 Claims, 7 Drawing Sheets

(56) References Cited

U.S. PATENT DOCUMENTS

| | | | |
|---|---|---|---|
| 2014/0237304 A1* | 8/2014 | Lai | G06F 11/0742 |
| | | | 714/57 |
| 2014/0288920 A1* | 9/2014 | Proux | G10L 15/00 |
| | | | 704/9 |
| 2015/0032669 A1* | 1/2015 | Winnick | G06N 5/04 |
| | | | 706/11 |
| 2019/0199736 A1* | 6/2019 | Howard | H04L 63/1425 |
| 2021/0004706 A1* | 1/2021 | Riddle | G06F 40/30 |
| 2021/0012352 A1* | 1/2021 | Yamagishi | H04M 3/493 |
| 2021/0157985 A1* | 5/2021 | Rotkop | G06F 40/205 |
| 2021/0182709 A1* | 6/2021 | Manchanda | G06N 5/022 |
| 2021/0256681 A1* | 8/2021 | Segal | G06N 3/045 |
| 2022/0171641 A1* | 6/2022 | Pichiliani | H04L 51/56 |
| 2022/0351716 A1* | 11/2022 | Kim | G10L 25/30 |
| 2023/0126090 A1* | 4/2023 | van de Nieuwegiessen | G06F 40/30 |
| | | | 709/206 |
| 2023/0128244 A1* | 4/2023 | Jha | G06F 16/3334 |
| | | | 704/9 |
| 2023/0132033 A1* | 4/2023 | Gupta | G06F 16/93 |
| | | | 717/120 |
| 2023/0135368 A1* | 5/2023 | Srivastava | G06F 16/1805 |
| | | | 707/822 |

OTHER PUBLICATIONS

Mandal, Atri, et al. "Improving it support by enhancing incident management process with multi-modal analysis." Service-Oriented Computing: 17th International Conference, ICSOC 2019, Toulouse, France, Oct. 28-31, 2019, Proceedings 17. Springer International Publishing, 2019. (Year: 2019).*

Bertero, C., Roy, M., Sauvanaud, C., & Trédan, G. (Oct. 2017). Experience report: Log mining using natural language processing and application to anomaly detection. In 2017 IEEE 28th International Symposium on Software Reliability Engineering (ISSRE) (pp. 351-360). IEEE. (Year: 2017).*

Anick, P. G. (2002). Integrating natural language processing and information retrieval in a troubleshooting help desk. IEEE expert, 8(6), 9-17. (Year: 2002).*

\* cited by examiner

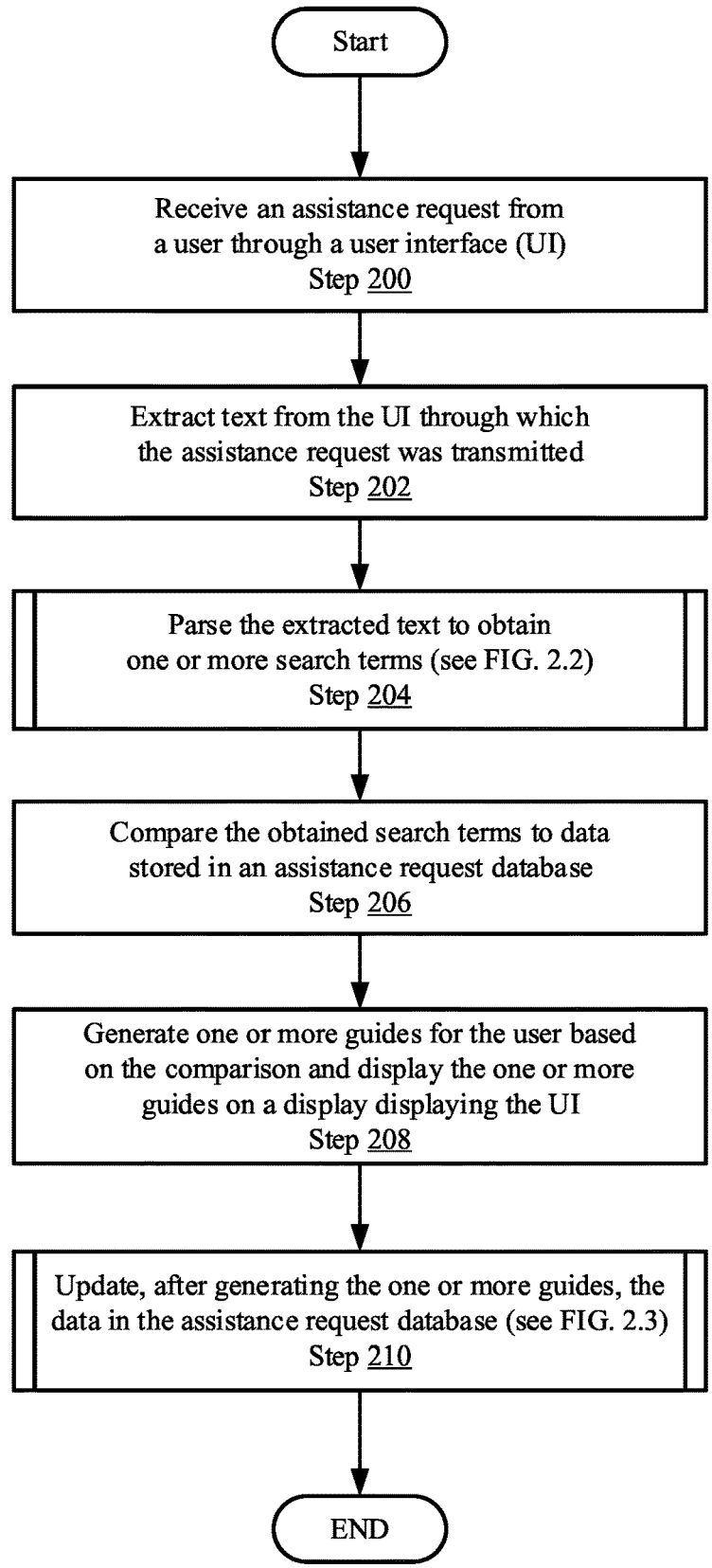
FIG. 2.1

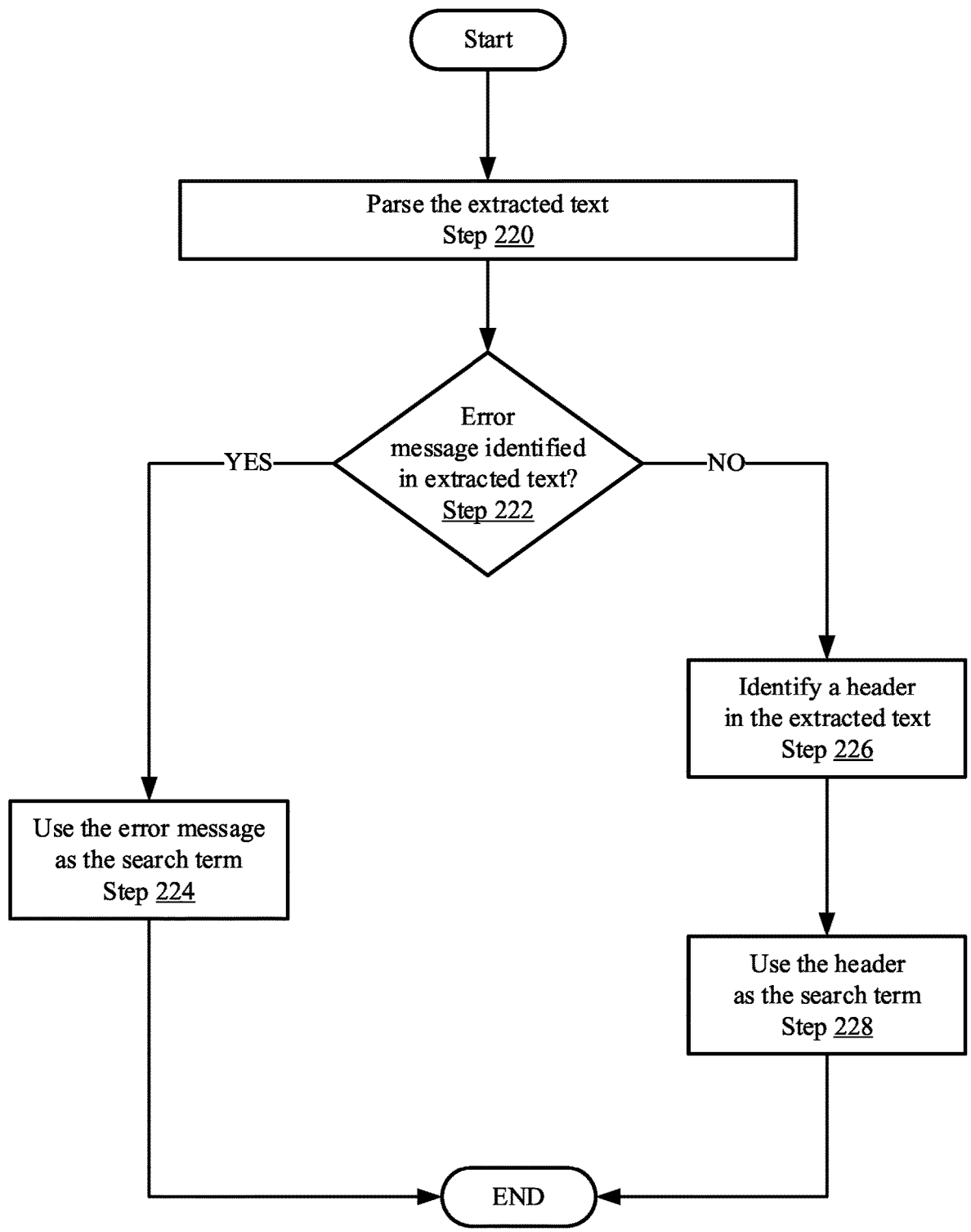
FIG. 2.2

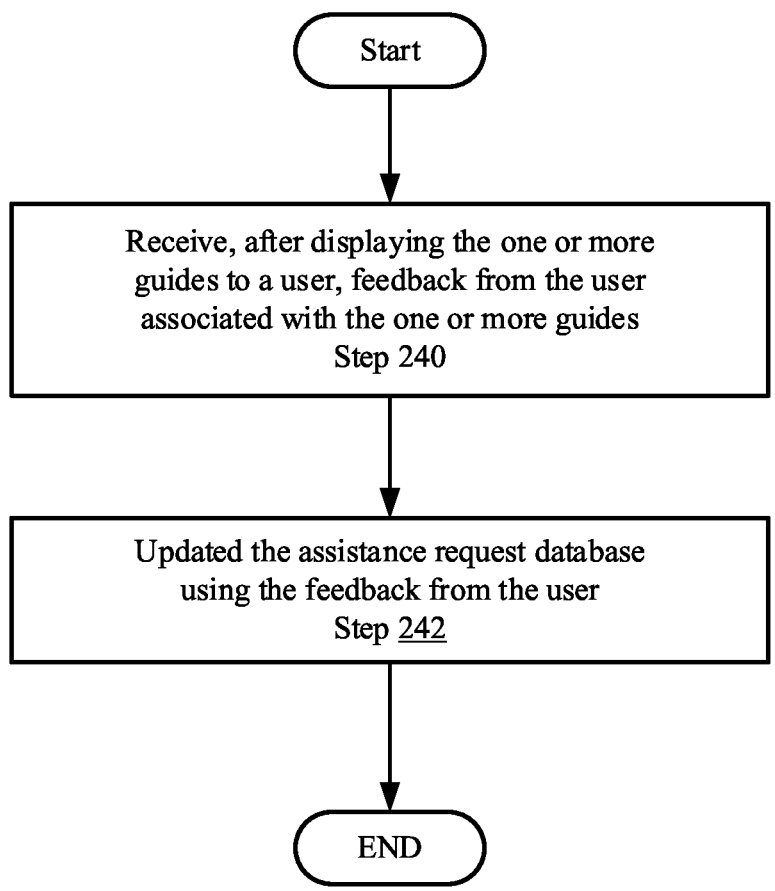
FIG. 2.3

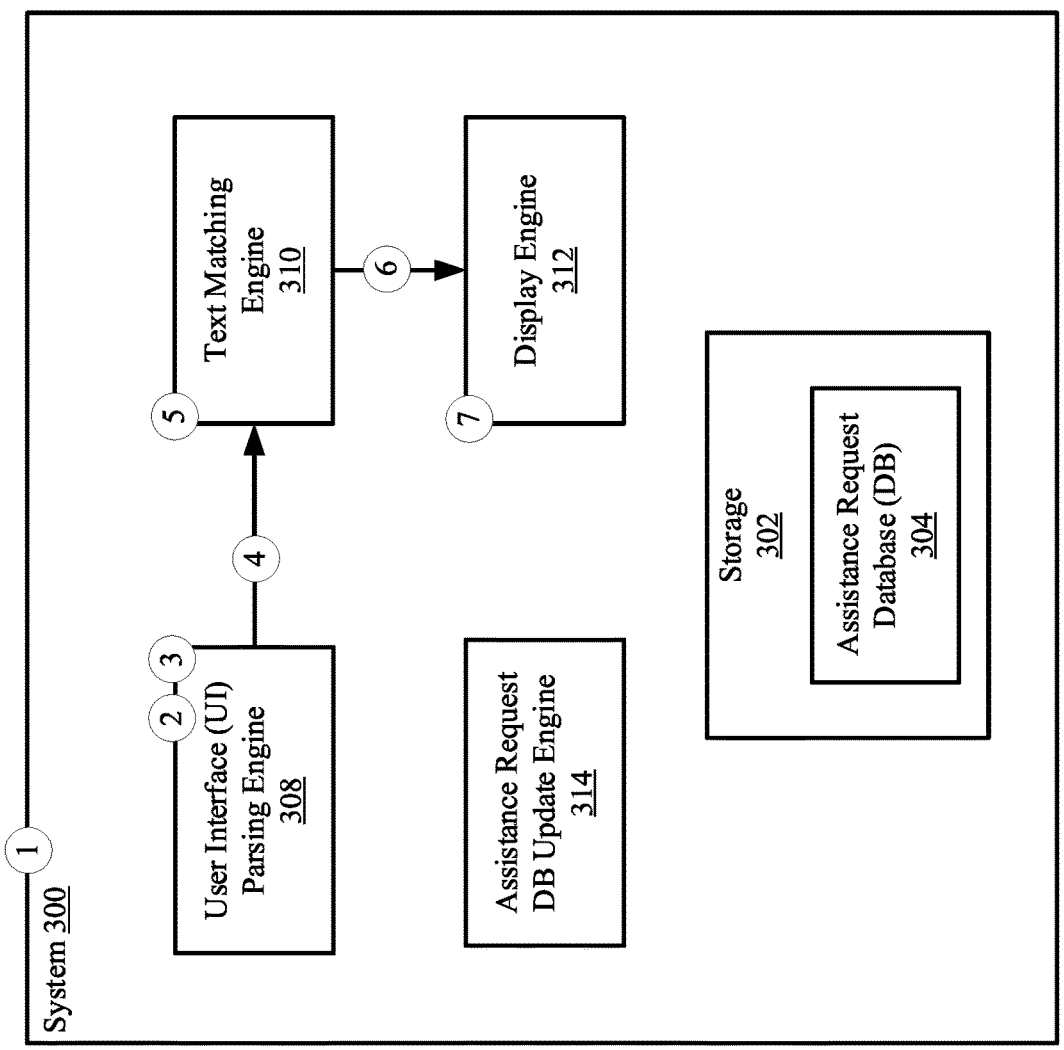
FIG. 3.1

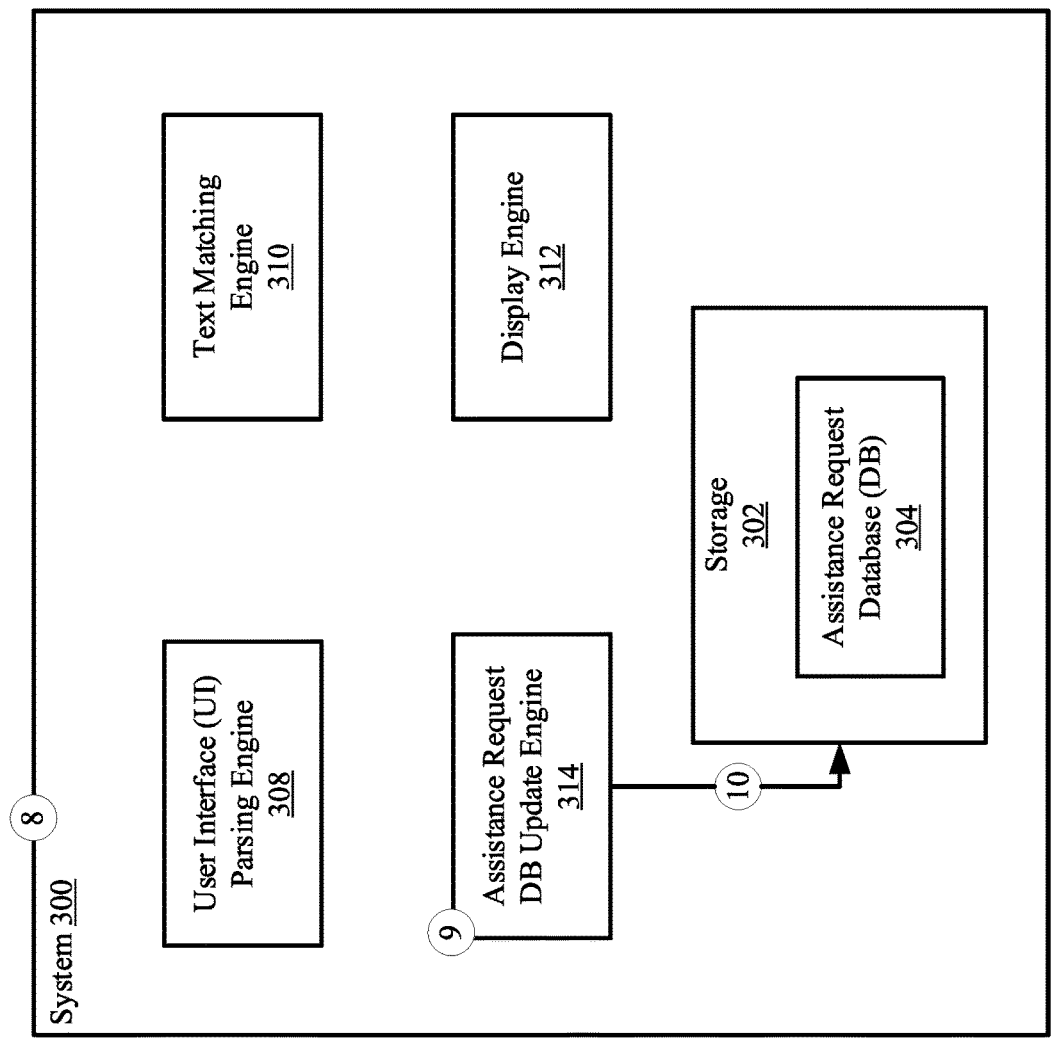
FIG. 3.2

SYSTEM AND METHOD FOR GENERATION OF SELF-GUIDED RECOVERY PROCEDURES AND SUGGESTIONS

BACKGROUND

Users frequently experience errors while using electronic products and services, and submit service requests (SRs) to resolve the experienced errors. These service requests are costly for owners (e.g., manufacturers, administrators, providers, etc.) of the products and services. Therefore, these owners may wish to provide ways for users to resolve the experienced errors without having to file any SRs.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 2.1-2.3 show flowcharts in accordance with one or more embodiments described herein.

FIGS. 3.1-3.2 show an implementation in accordance with one or more embodiments described herein.

DETAILED DESCRIPTION

Figure 1:
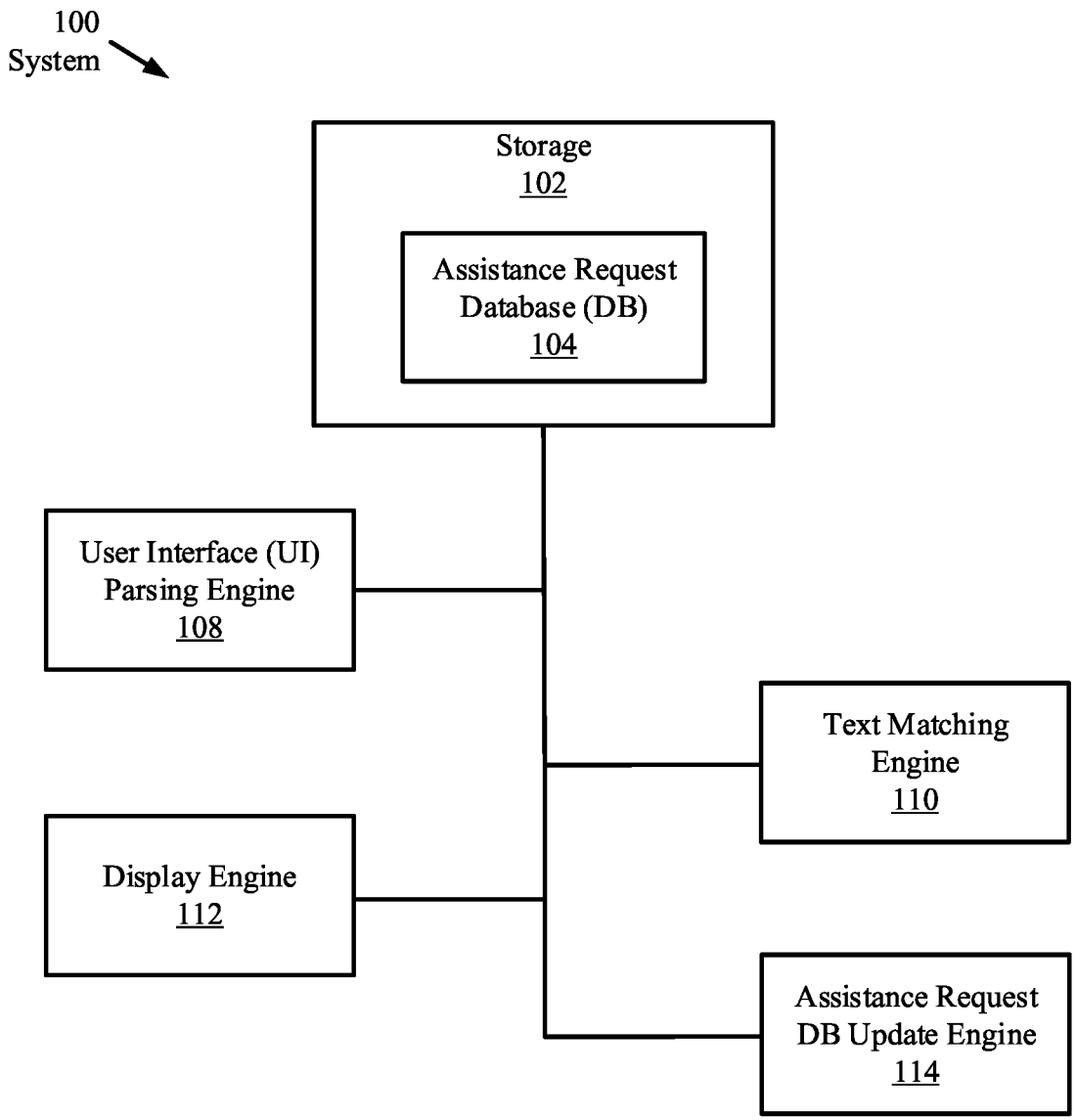
FIG. 1 shows a system in accordance with one or more embodiments described herein.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments disclosed herein are directed to systems and methods for generating a self-guided troubleshooting guide for resolving errors. In particular, the self-guided troubleshooting guide generation method of one or more embodiments disclosed herein generates recovery procedures and suggestions for users to resolve errors experienced while using one or more products and services offered by an owner (e.g., a manufacturer, an administrators, a provider, etc.) of the one or more products and services. Even without experiencing an error, users may also submit an assistance request to retrieve one or more guides and suggestions for using and navigating the one or more products and/or services. By providing users with the appropriate information to resolve errors and questions by themselves, the amount of service requests (SRs) being submitted by users experiencing an error and/or having questions about the one or more products and services can be advantageously reduced, which directly helps owners of these products and services reduce costs associated with resolving the submitted SRs.

In the context of one or more embodiments disclosed herein, the term "product and services" may refer to either a single product, a single service, a combination of both a product and a service, or a combination of multiple products and/or services. Examples of products being provided by owners may include, but are not limited to: downloadable computer-executable programs, applications (e.g., mobile phone applications), a physical product (e.g., user devices such as a laptop, a desktop computer, a mobile phone, tablet, etc.), etc. Examples of services may include, but are not limited to: software as a service (SaaS); one or more applications running on a web browser environment, updates for computer-executable programs, etc.

One or more embodiments disclosed herein may also provide a real-time assistance request database (DB) that is updated using information gathered from resolved and/or unresolved assistance requests. An assistance request may be submitted by a user when the user is experiencing an issue with one or more products and services (e.g., experiencing an error with a product and service, being unsure about how to use the product and service and would like to learn more about how to use the product and service, etc.). The results of each assistance request (e.g., information about the issue associated with the request, information on whether an assistance request was successfully or unsuccessfully resolved, information on how the assistance request was successfully resolved, etc.) may be used to constantly update the information stored in the assistance request DB. This advantageously allows the assistance request DB to always include the most-up-to-date information on issues being experienced by users and how these issues are being resolved (or if these issues cannot be resolved) by the users with or without having to submit any SRs.

Various embodiments of the disclosure are described below.

FIG. 1 shows a system (100) in accordance with one or more embodiments. The system includes a storage (102), a user interface parsing engine (108), a text matching engine (110), a display engine (112), and an assistance request DB update engine (114). In one or more embodiments disclosed herein, the system (100) may be part of a computing system (e.g., 400, FIG. 4). Each of these components of the system (100) will be described in more detail below.

As shown in FIG. 1, the system (100) includes the storage (102). The storage (102) may be implemented using volatile or non-volatile storage or any combination thereof. The storage (102) is configured to store an assistance request database (DB) (104). The assistance request database (DB) (104) may be data structure (i.e., one or more lists, tables, collection of data values, etc.) storing information on issues experienced by users and information associated with solutions and suggestions for resolving the issues experienced by the users. For example, the assistance request database (DB) may store keywords associated with errors a user may experience while using a product and service. These keywords may be associated with one or more solutions and suggestions for resolving the issues experienced by the users.

More specifically, in one or more embodiments disclosed herein, the assistance request DB may store keywords and their respective solutions in a key-value pair format. For example, a common term associated with an error (e.g., 404, no internet connectivity, support, bug, etc.) may be stored as the key (e.g., the keyword) of the key-value pair format. Solutions and suggestions for resolving such an error (e.g., the error is harmless and can be ignored, restart device, check router and modem operation, a link to a section of a release note and/or admin guide associated with the product and service, a link to a knowledge base (KB) article written to resolve the issue, etc.) may be stored as the value associated with the keyword in the key-value pair format. Similarly, keywords directed to a product and service (e.g., Excel, Gmail, etc.) may be stored with information (e.g., guides, tutorials, etc.) showing users how to use one or more functions of the product and service in the key-value pair format.

In one or more embodiments, information stored in the assistance request DB (104) may be retrieved from sources such as, but are not limited to: release notes, install/upgrade guides, administrator guides, knowledge base (KB) articles, service requests, known error codes, and feedback from resolved and/or unresolved assistance requested submitted by users. One having ordinary skill in the art would appreciate that other sources that may provide similar information about a product and service may also be used without departing from the scope of one or more embodiments disclosed herein.

Additionally, in one or more embodiments, the assistance request DB (104) may be stored in a device (e.g., another volatile or non-volatile storage or any combination thereof) that is external to and separate and distinct from the storage (102). For example, the device may be a virtual storage (or a physical instance thereof) instantiated on a network device (e.g., a server) operated and maintained by the owner of the product and service.

In one or more embodiments disclosed herein, the system (100) further includes the user interface parsing engine (108). The user interface parsing engine (108) may be implemented in hardware (i.e., circuitry), software, or any combination thereof. In one or more embodiments, the user interface parsing engine (108) may be configured to parse one or more computer-readable characters (referred to herein simply as "texts") from a current user interface (UI) (e.g., a graphical user interface (UI), a display window, one or more content being displayed on the display, etc.) being displayed to a user using a specific product and service.

Additional details of the processes executed by the user interface parsing engine (108) are discussed below in FIGS. 2.1-2.3.

In one or more embodiments disclosed herein, the system (100) further includes the text matching engine (110). The text matching engine (110) may be implemented in hardware (i.e., circuitry), software, or any combination thereof. In one or more embodiments, the text matching engine (110) may be configured match one or more texts parsed from the current UI with one or more key-value pairs stored in the assistance request database (DB). Additional details of the processes executed by the text matching engine (110) are discussed below in FIGS. 2.1-2.3.

In one or more embodiments disclosed herein, the system (100) further includes the display engine (112). The display engine (112) may be implemented in hardware (i.e., circuitry), software, or any combination thereof. In one or more embodiments, the display engine (112) may be configured to generate instructions for displaying any one of: the current user interface; the content being displayed on the display, the solutions and suggestions retrieved from the assistance request database DB, etc. Additional details of the processes executed by the display engine (112) are discussed below in FIGS. 2.1-2.3.

In one or more embodiments disclosed herein, the system (100) further includes the assistance request DB update engine (114). The assistance request DB update engine (114) may be implemented in hardware (i.e., circuitry), software, or any combination thereof. In one or more embodiments, the assistance request DB update engine (114) may be configured to continuously update the assistance request DB (e.g., in real-time) to ensure that the assistance request DB always includes the most-up-to-date information on issues being experienced by users and how these issues are being resolved (or if these issues cannot be resolved) by the users. Additional details of the processes executed by the display engine (112) are discussed below in FIGS. 2.1-2.3.

Although the system (100) is shown as having five components (102, 108, 110, 112, 114), in other embodiments of the invention, the system (100) may have more or fewer components. Further, the functionality of each component described above may be split across components or combined into a single component (e.g., the functionalities of the text matching engine (110) and the display engine (114) may be combined to be implanted by a single component. Further still, each component (102, 108, 110, 112, 114) may be utilized multiple times to carry out an iterative operation.

Turning now to FIGS. 2.1-2.3, FIGS. 2.1-2.3 show flowcharts in accordance with one or more embodiments disclosed herein. The methods depicted in FIGS. 2.1-2.3 may be performed to generate one or more self-guided troubleshooting guides for users of a product and service to resolve an issue being experienced. The methods shown in FIGS. 2.1-2.3 may be performed, for example, by a combination of the user interface parsing engine (e.g., 108, FIG. 1), the text matching engine (e.g., 110, FIG. 1), the display engine (e.g., 112, FIG. 1), and the assistance request DB update engine (e.g., 114, FIG. 1). Other components of the system in FIG. 1 may perform all, or a portion, of the methods of FIGS. 2.1-2.3 without departing from the scope of one or more embodiments described herein.

While FIGS. 2.1-2.3 are illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, an assistance request is received from a user through a user interface (UI) being displayed to a user on a display. In one or more embodiments, the assistance request specifies that the user is experiencing an issue with one or more products and services (e.g., experiencing an error with a product and service, being unsure about how to use the product and service and would like to learn more about how to use the product and service, etc.). The user may transmit the assistance request by clicking a clickable icon and/or button (e.g., a button labeled as "guide me") included on the UI.

For example, assume that a user sees an error message on the UI. The user may then click the "guide me" button to initiate an assistance request to help the user resolve the error. This may be categorized as an "Error Resolution Request" by the user.

As another example, assume that it is the first time the user is using a product and service associated with the UI and does not know how to operate the product and service. The user may then click the "guide me" button to request information on how to operate the product and service. This may be categorized as a "How to Request" by the user.

In Step 202, after receiving the assistance request in Step 200, one or more embodiments disclosed herein parses and extracts (e.g., using the user interface parsing engine (e.g., 108, FIG. 1)) all of the text from the UI through which the assistance request was transmitted. Alternatively, only a portion of the text from the UI may be parsed and extracted.

For example, assume that the assistance request is the "Error Resolution Request." One or more embodiments disclosed herein may either parse and extract all of the text in the UI to identify one or more error messages (e.g., an error code, an error string, etc.) being shown in the UI or parse and extract the text in the UI to the point where a first error message is detected and extracted.

As another example, assume that the assistance request is the "How to Request." One or more embodiments disclosed herein may parse and extract all of the text in the UI. After parsing and extracting all of the text in the UI, it may be determined that there are no error messages in the UI. In such a case, one or more embodiments disclosed herein may identify one or more headers within the UI that describe the product and service (and/or a specific function/feature of the product and service) associated with the UI.

In Step 204, the text extracted from the UI is parsed (e.g., using the user interface parsing engine (e.g., 108, FIG. 1)) to obtain one or more search terms. This will be discussed in more detail below in FIG. 2.2.

In Step 206, the obtained search terms are compared (e.g., using the text matching engine (e.g., 110, FIG. 1)) to data stored in the assistance request DB (e.g., 104, FIG. 1). More specifically, in one or more embodiments, the obtained search terms may be compared to the key portion of the key-value pairs stored in the assistance request DB to find a best match between the obtained search terms and the key portions stored in the assistance request DB. As one non-limiting example, the comparison may be executed by approximating a Jaccard similarity coefficient for each key value of the key-value pairs stored in the assistance request DB, and using a min-hash function to find the best match with the obtained search term. Although a specific example is described above, one of ordinary skill in the art would appreciate that other methods (e.g., methods using natural language processing (NLP), etc.) may be used to determine a key-value pair with a key component having a highest (i.e., closest) match with the one or more search terms. In one or more embodiments, the text matching engine may be a model that is trained to (i.e., a trained model that) identify a key-value pair with a key component having a highest (i.e., closest) match with the one or more search terms.

In Step 208, one or more self-guided troubleshooting guides may be generated for the user based on the comparison in Step 206. Additionally, in Step 208, the one or more generated self-guided troubleshooting guides may be displayed (e.g., using the display engine (e.g., 112, FIG. 1)) on a display that is displaying the UI.

More specifically, in one or more embodiments, each generated self-guided troubleshooting guide may include the value portion of the key-value pair having a highest (i.e., closest) match with the one or more search terms. Said in another way, each self-guided troubleshooting guide may include a list of suggestions and solutions for the user to independently (in a self-guided method) resolve the issue that the user is experiencing with the product and service. In one or more embodiments, the list of suggestions and solutions may be provided such that a most commonly used or best-recommended solution and/or suggestion used to resolve the issue is presented at the top of the list. This ordering of the solutions and suggestions may be a reflection of an ordering of the solution and suggestions as stored in the key-value pair format in the assistance request database. As such, a user will advantageously be presented with the most commonly used or best-recommended solution and/or suggestion for resolving the issue being experienced.

In one or more embodiments, in addition to generating the self-guided troubleshooting guides, an SR may also be automatically generated and populated. More specifically, one or more embodiments disclosed herein may use information from the key-value pair having a highest (i.e., closest) match with the one or more search terms to determine what information is necessary to be included in the SR. In the event that an SR is automatically generated, the respective self-guided troubleshooting guide may also include instructions for the user to supplement information (e.g., screen captures of the UI, screen captures of one or more systems logs, etc.) that would be helpful to include in the SR.

In one or more embodiments, if it is determined (in Step 206) that no key-value pair stored in the assistance request DB matches or is a close match to the one or more search terms, the generated self-guided troubleshooting guide(s) may advise the user to complete the automatically generated and pre-populated SR and submit the completed SR to the owner of the product and service.

In one or more embodiments, the self-guided troubleshooting guides may also include text encouraging the user to try all of the listed suggestions and solutions before submitting the SR. This advantageously prevents the user from prematurely submitting an SR, which incurs costs to the owner of the product and service to resolve, before the user is able to try the self-guided approach of resolving the issue.

In Step 210, after generating the one or more self-guided troubleshooting guides, the data in the assistance request DB is updated such that the assistance request DB always includes the most-up-to-date information on issues being experienced by users and how these issues are being resolved (or if these issues cannot be resolved) by the users. This is described in more detail below in FIG. 2.3.

Turning now to FIG. 2.2, as discussed above, the text extracted from the UI in Step 204 is parsed (e.g., using the user interface parsing engine (e.g., 108, FIG. 1)). This will now be described in more detail below.

In Step 220, the text extracted from the UI is parsed. Once the text is parsed, one or more embodiments disclosed herein determines (in Step 222) whether any error messages are included in the text extracted from the UI.

In one or more embodiments, in the event that one or more error messages are identified in the text extracted from the UI (i.e., YES, in Step 222), the identified error messages are selected (in Step 224) to be used as the one or more search terms. Alternatively, in the event that no error messages are identified (i.e. NO in Step 222), one or more headers are identified (in Step 226) in the text extracted from the UI and selected (in Step 228) to be used as the one or more search terms.

In one or more embodiments, an entirety of the one or more identified error messages and/or headers may be used as the one or more search terms. Alternatively, only a portion of the one or more identified error messages and/or headers may be used as the one or more search terms. In such a case, one or more embodiments disclosed herein may parse the one or more identified error messages and/or headers and identify one or more terms within these identified text that best describes the identified text. For example, assume that the error message reads "error with network connectivity." Any combination of the terms "network" and "connectivity" may be selected instead of selecting the entire error message. As another example, assume that the header reads "How to sum numbers in Excel". The terms that may be selected instead of using the entire header may be the combination of "sum" and "Excel".

Turning now to FIG. 2.3, as discussed above in Step 210 of FIG. 2.1, after generating the one or more self-guided troubleshooting guides, the data in the assistance request DB is updated such that the assistance request DB always includes the most-up-to-date information on issues being experienced by users and how these issues are being resolved (or if these issues cannot be resolved) by the users. This will now be described in more detail below.

In Step 240, feedback from the user associated with the one or more generated self-guided troubleshooting guides is received. In one or more embodiments, the generated self-guided troubleshooting guides may include a section for the user to provide feedback in the form of, for example but not limited to, a survey. The generated self-guided troubleshooting guides may also be configured to keep track of (e.g., in the form of system data logs) how the user is able to resolve the issue.

In Step 242, the assistance request DB is updated (e.g., using the assistance request DB update engine (e.g., 114. FIG. 1)) using the feedback received from the user. This advantageously allows the assistance request DB to always include the most-up-to-date information on issues being experienced by users and how these issues are being resolved (or if these issues cannot be resolved) by the users.

FIGS. 3.1-3.2 show an implementation example in accordance with one or more embodiments. In particular, FIGS. 3.1-3.2 shows an example of generating a self-guided troubleshooting guide and how the assistance request DB is updated after the generation and use of the self-guided troubleshooting guide. The numbers in the brackets below, e.g., "[1]", correspond to the same circled numbers in FIGS. 3.1-3.2.

BEGINNING OF EXAMPLE

Initially, as shown in FIG. 3.1, the system (300) (e.g., system 100, FIG. 1) receives an assistance request from a user [1]. In response to receiving the assistance request, the user interface (UI) parsing engine (308) (e.g., 108, FIG. 1) parses and extracts all of the text from a UI through which the assistance request was transmitted [2]. The UI parsing engine (308) then parses the extracted text from the UI to obtain a search term [3]. This search term is then sent from the UI parsing engine (308) to the text matching engine (310) (e.g., 110, FIG. 1) [4].

Once the text matching engine (310) receives the search term, the text matching engine compares the search term to key-value pairs stored in the assistance request database (DB) (304) (e.g., 104, FIG. 1) to find a closest matched key-value pair to the search term [5]. The text matching engine (310) identifies the closest matched key-value pair and transmits information associated with the closest matched key-value pair to the display engine (312) (e.g., 112, FIG. 1) [6]. In response, the display engine (312) generates a self-guided troubleshooting guide based on the information associated with closest matched key-value pair and transmits instructions to the device being used by the user to display the generated self-guided troubleshooting guide [7].

Turning now to FIG. 3.2, after some time has passed since the events in FIG. 3.1, the system (300) received feedback from the user with regard to the generated self-guided troubleshooting guide [8]. The feedback is processed by the assistance request DB update engine (314) (e.g., 114, FIG. 1) [9]. After processing the feedback, the assistance DB update engine (314) transmits information associated with the feedback to the storage (302) (e.g., 102, FIG. 1) in order to store the information in the (i.e., update the) assistance request DB (304) [10].

END OF EXAMPLE

Figure 4:
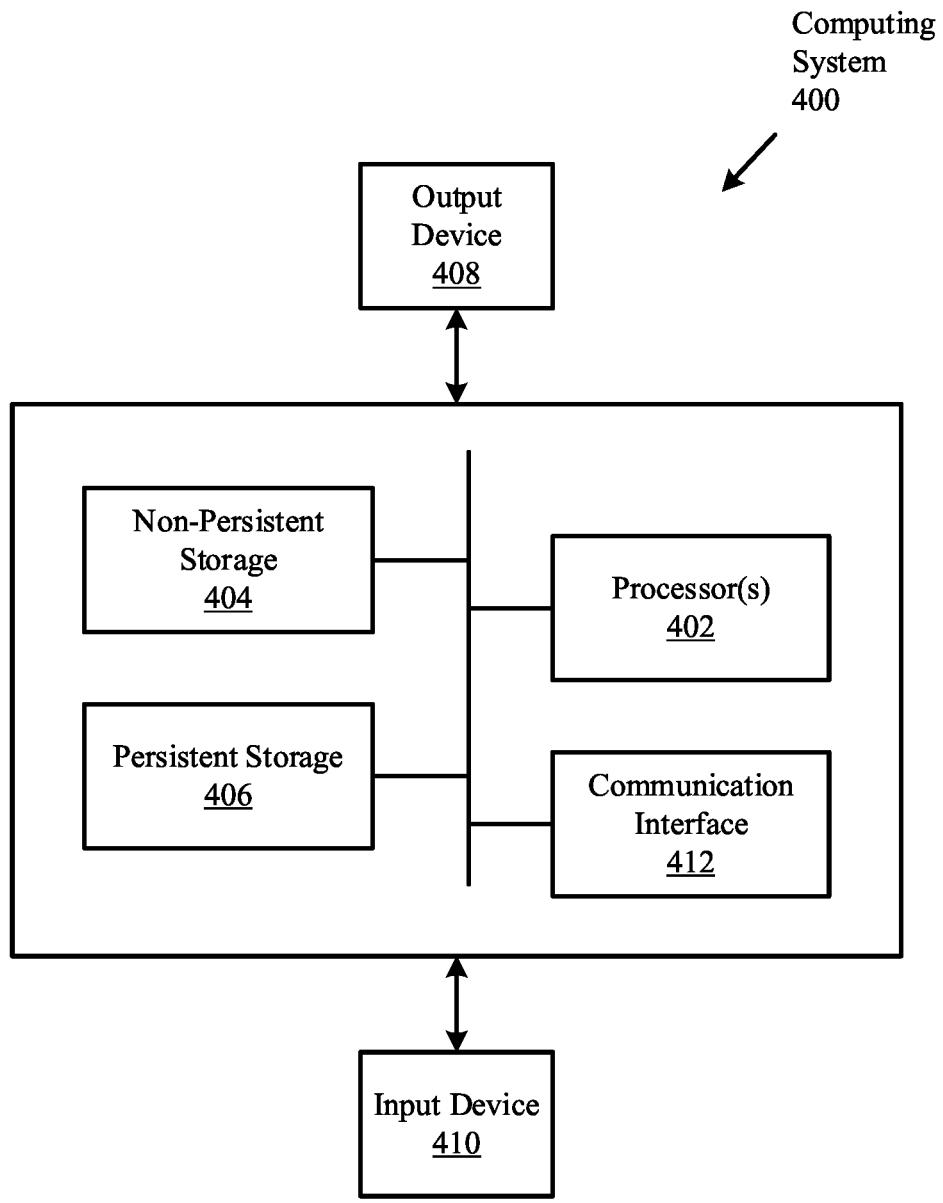
FIG. 4 shows a computer system in accordance with one or more embodiments described herein.

FIG. 4 shows a computer system in accordance to one or more embodiments.

Embodiments disclosed herein may be implemented using computing devices and/or computing systems. FIG. 4 shows a diagram of a computing device in accordance with one or more embodiments disclosed herein. Computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing system (400) may also include one or more input devices (410), such as a touchscreen, keyboard, mouse, microphone, touchpad, electronic pen, or any other type of input device. Further, communication interface (412) may include an integrated circuit for connecting computing system (400) to a network (not shown) (e.g., a local area network (LAN), a wide area network (WAN) such as the Internet, mobile network, or any other type of network) and/or to another device, such as another computing system.

In one embodiment disclosed herein, computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

Embodiments disclosed herein may provide a less resource-intensive process for owners of products and services to resolve issues experienced by users using the products and services. More specifically, by providing solutions and suggestions to issues in a self-guided troubleshooting guide, users are encouraged to troubleshoot and resolve issues before prematurely submitting one or more SRs, which incur costs for the owner to resolve. In particular, the solutions and suggestions may reflect solutions and suggestions provided to other users who previously submitted a similar SR that is about to be submitted by another user. Additionally, information with regard to how the user resolves the issues using the generated self-guided troubleshooting guide can be obtained as feedback for updating (in real-time) an assistance request database storing all the solutions and suggestions. This advantageously ensures that the assistance request DB always includes the most-up-to-date information on issues being experienced by users and how these issues are being resolved (or if these issues cannot be resolved) by the users with or without having to submit any SRs. The feedback received from the user's usage of the generated self-guided troubleshooting may also advantageously help the owners offering the products and services to take proactive steps to prevent similar issues from repeatedly occurring.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A self-guided troubleshooting guide generation method comprising:
   receiving a first assistance request from a user using a first display;
   in response to receiving the first assistance request, scanning a first user interface (UI) displayed on the first display;
   extracting, using a user interface parsing engine and the scanning, all text from the first UI displayed on the first display to obtain extracted text;
   parsing, using the user interface parsing engine, the extracted text and identifying an error message in the extracted text;
   receiving, at a text matching engine, the error message:
   searching, via the text matching engine and after the receiving, data stored in an assistance request database by:
   comparing the error message to data stored in the assistance request database, wherein the comparing comprises:
   approximating a Jaccard similarity coefficient for each of a plurality of key-value pairs stored in the assistance request database; and
   finding a set of potential matches for the error message using the Jaccard similarity coefficient for each of the plurality of key-value pairs and a min-hash function;
   generating, based on the comparing and using the set of potential matches, solution information for resolving the error message;
   displaying the solution information as part of the self-guided troubleshooting guide on the first display, by automatically displaying the set of potential matches in an order from most commonly used to least commonly used;
   automatically generating and populating a service request using the solution information and displaying the service request on the first display;
   tracking, via system data logs, user interactions with the displayed solution to detect resolution success or failure;
   receiving, after displaying the solution, feedback from the user directed to the solution, wherein the feedback comprises the user interactions; and
   updating, in real-time and in response to receiving the feedback and using the feedback, the data in the assistance request database.

2. The method of claim 1, wherein the data in the assistance request database is compiled using information from release notes, install/upgrade guides, administrator guides, knowledge base (KB) articles, service requests, and known error codes.

3. The method of claim 1, wherein the method further comprises:
   receiving a second assistance request from the user;
   in response to receiving the second assistance request, scanning a second UI through which the second assistance request is transmitted and extracting text from the second UI;
   parsing the extracted text from the second UI and identifying no error messages in the extracted text of the second UI;
   retrieving, in response to identifying no error messages in the extracted text of the second UI, one or more predefined keywords associated with a content of the text shown on the second UI;
   comparing, after the retrieving, the one or more predefined keywords with the data stored in the assistance request database; and
   generating, based on the comparing, tutorial information associated with the content of the text shown on the second UI and displaying the tutorial information on a display displaying the second UI.

4. The method of claim 3,
   wherein the data stored in the assistance request database further comprises a plurality of product tutorials and a plurality of product keywords, wherein tutorial information is one of the plurality of product tutorials, and
   wherein comparing the one or more predefined keywords with the data stored in the assistance request database comprises parsing the assistance request database to find a product keyword among the plurality of product keywords having a highest match with the one or more predefined keywords.

5. The method of claim 4,
wherein the plurality of product tutorials and the plurality of product keywords are stored in the assistance request database in a key-value pair format, and
wherein a product tutorial, among the plurality of product tutorials, associated in the key-value pair format with the product keyword having the highest match with the one or more predefined keywords is transmitted as the tutorial information.

6. A non-transitory computer readable medium (CRM) comprising computer readable program code, which when executed by a computer processor enables the computer processor to perform a self-guided troubleshooting guide generation method, the method comprising:
receiving a first assistance request from a user using a first display;
in response to receiving the first assistance request, scanning a first user interface (UI) displayed on the first display;
extracting, using a user interface parsing engine and the scanning, all text from the first UI displayed on the first display to obtain extracted text;
parsing, using the user interface parsing engine, the extracted text and identifying an error message in the extracted text;
receiving, at a text matching engine, the error message:
searching, via the text matching engine and after the receiving, data stored in an assistance request database by:
comparing the error message to data stored in the assistance request database, wherein the comparing comprises:
approximating a Jaccard similarity coefficient for each of a plurality of key-value pairs stored in the assistance request database; and
finding a set of potential matches for the error message using the Jaccard similarity coefficient for each of the plurality of key-value pairs and a min-hash function;
generating, based on the comparing and using the set of potential matches, solution information for resolving the error message;
displaying the solution information as part of the self-guided troubleshooting guide on the first display, by automatically displaying the set of potential matches in an order from most commonly used to least commonly used;
automatically generating and populating a service request using the solution information and displaying the service request on the first display;
tracking, via system data logs, user interactions with the displayed solution to detect resolution success or failure;
receiving, after displaying the solution, feedback from the user directed to the solution, wherein the feedback comprises the user interactions; and
updating, in real-time and in response to receiving the feedback and using the feedback, the data in the assistance request database.

7. The CRM of claim 6, wherein the data in the assistance request database is compiled using information from release notes, install/upgrade guides, administrator guides, knowledge base (KB) articles, service requests, and known error codes.

8. A system comprising:
a memory; and
a processor coupled to the memory, wherein the processor is configured to generate a self-guided troubleshooting guide by:
receiving a first assistance request from a user using a first display;
in response to receiving the first assistance request, scanning a first user interface (UI) displayed on the first display;
extracting, using a user interface parsing engine and the scanning, all text from the first UI displayed on the first display to obtain extracted text;
parsing, using the user interface parsing engine, the extracted text and identifying an error message in the extracted text;
receiving, at a text matching engine, the error message:
searching, via the text matching engine and after the receiving, data stored in an assistance request database by:
comparing the error message to data stored in the assistance request database, wherein the comparing comprises:
approximating a Jaccard similarity coefficient for each of a plurality of key-value pairs stored in the assistance request database; and
finding a set of potential matches for the error message using the Jaccard similarity coefficient for each of the plurality of key-value pairs and a min-hash function;
generating, based on the comparing and using the set of potential matches, solution information for resolving the error message;
displaying the solution information as part of the self-guided troubleshooting guide on the first display, by automatically displaying the set of potential matches in an order from most commonly used to least commonly used;
automatically generating and populating a service request using the solution information and displaying the service request on the first display;
tracking, via system data logs, user interactions with the displayed solution to detect resolution success or failure;
receiving, after displaying the solution, feedback from the user directed to the solution, wherein the feedback comprises the user interactions; and
updating, in real-time and in response to receiving the feedback and using the feedback, the data in the assistance request database.

9. The system of claim 8, wherein the data in the assistance request database is compiled using information from release notes, install/upgrade guides, administrator guides, knowledge base (KB) articles, service requests, and known error codes.

* * * * *